Oct. 29, 1957      H. J. SHAFER      2,811,142
ROTOR BEARING SEAL FOR FLUID MOTOR
Filed March 23, 1955      3 Sheets-Sheet 1

INVENTOR.
HOMER J. SHAFER
BY
ATTORNEYS

Oct. 29, 1957 H. J. SHAFER 2,811,142
ROTOR BEARING SEAL FOR FLUID MOTOR
Filed March 23, 1955 3 Sheets-Sheet 3

INVENTOR.
HOMER J. SHAFER
BY Ely, Frye & Hamilton
ATTORNEYS

United States Patent Office 2,811,142
Patented Oct. 29, 1957

2,811,142

ROTOR BEARING SEAL FOR FLUID MOTOR

Homer J. Shafer, Mansfield, Ohio, assignor to Shafer Valve Company, Mansfield, Ohio, a corporation of Ohio Application March 23, 1955, Serial No. 496,210

2 Claims. (Cl. 121—99)

The invention relates generally to fluid motors of the rotary vane type, and more particularly to improved sealing means between moving parts of the motor capable of maintaining fluid-tight seals under high pressures.

Rotary vane fluid or hydraulic motors have one or more vanes secured to a rotor shaft journaled at its ends in the motor housing, and stops or abutment shoes are provided in the annular space between the rotor and housing to limit oscillation of the vanes in opposite directions. A rotary fluid motor having ordinary sealing means around the vanes and shoes, such as spring loaded sealing plates and adjustable sealing strips, is not practical for high pressures, because under high pressures fluid seeps past the seals from the pressure chamber to the exhaust chamber, particularly when a vane is subjected to pressure after it has been rotated to its limit in one direction or the other. This seepage reduces the efficiency of the motor and causes unbalance of the pressure fluid in the motor chambers if the flud flows to and from the motor in a closed system with pressure tanks.

By using O-ring seals extending continuously around the edges of the vanes and shoes, as shown in the U. S. patent to Moushey et al., No. 2,540,903, dated February 6, 1951, a fluid motor was provided that would take considerably higher pressures without substantial seepage, than a motor using ordinary seals. However, the motor of said patent has annular shoulders on the rotor shaft at the ends of the vane for abutting the end walls of the housing to transmit axial thrust on the rotor, and regardless of how close working tolerances are maintained between the shoulders and end walls, leakage occurs past the vanes and shoes from one chamber to another along these annular shoulders which bridge over said vanes and shoes. Moreover, under high pressures the end plates of the housing bow outwardly, tending to increase the clearance between the plates and the annular shoulders, and thus increase the amount of leakage across the vanes and shoes.

In my co-pending application Serial No. 478,381, filed December 29, 1954, a similar motor, without the annular shoulders on the rotor, but with an improved sealing construction for the vanes and shoes, is disclosed.

This shoulderless rotor construction reduced leakage across the vanes and shoes by eliminating the metal-to-metal joints between annular shoulders on the rotor and the end plates, which joints were spread apart by bowing of the end plates under high pressures, but the working tolerance between the ends of the rotor shaft and their journals in the housing end walls still provide very thin annular clearances which bridge over the vanes and shoes, and through which seepage from one chamber to another can occur at high pressures.

It is an object of the present invention to provide an improved rotary vane fluid motor construction in which substantially all leakage from one chamber to another under high pressures is eliminated.

A specific object of the present invention is to provide an improved sealing construction for the rotor bearings of a fluid motor, to substantially eliminate all seepage around the bearings across the vanes and shoes.

In the present invention the annular clearances between the rotor and its journals adjoining the ends of the motor chamber are sealed, to prevent bridging of fluid across the vanes and shoes, by providing annular reservoirs of sealing compound in communication with said clearances, and means for feeding sealing compound into said reservoirs under constant pressure. A preferred embodiment of the present invention is shown by way of example in the accompanying drawings and described in detail herein. Various changes and modifications in details of construction are contemplated within the scope of the invention as defined in the appended claims.

Figure 1:
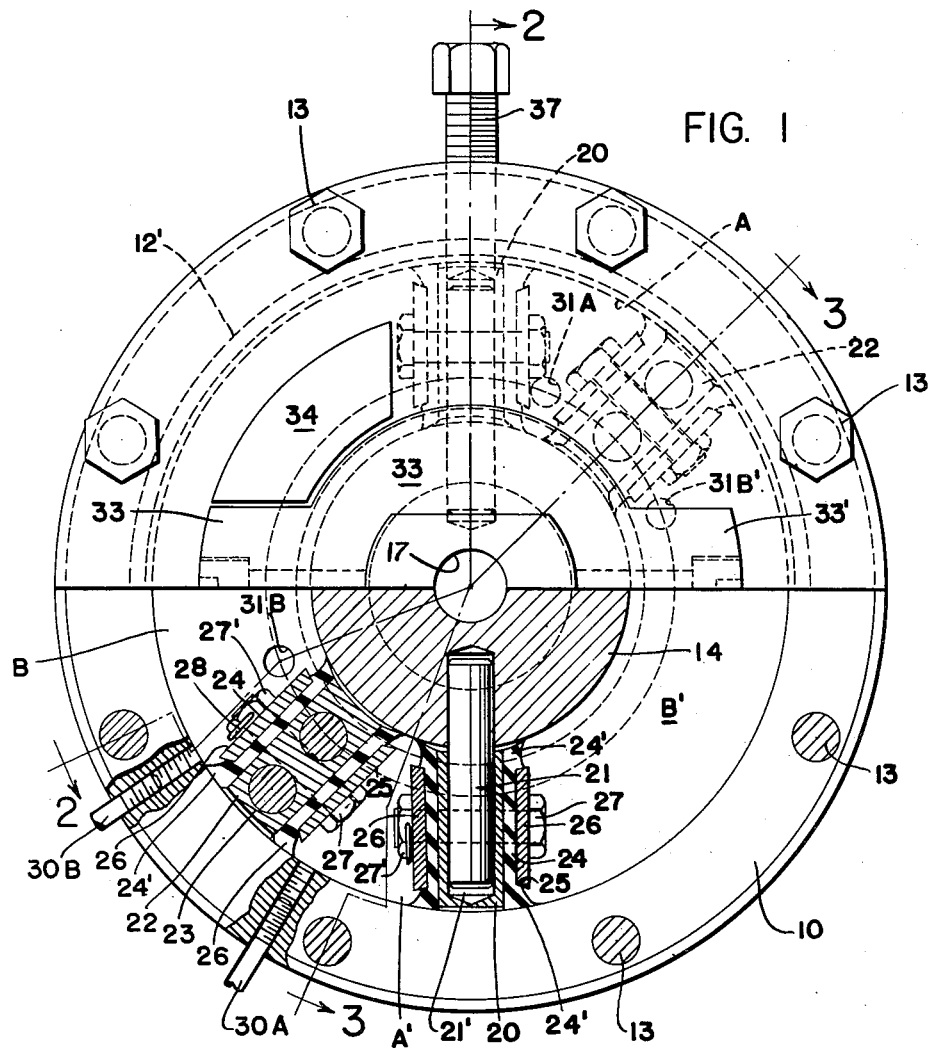
Fig. 1 is a plan view, partly in section, of a rotary vane hydraulic motor embodying the invention.
Figure 4:
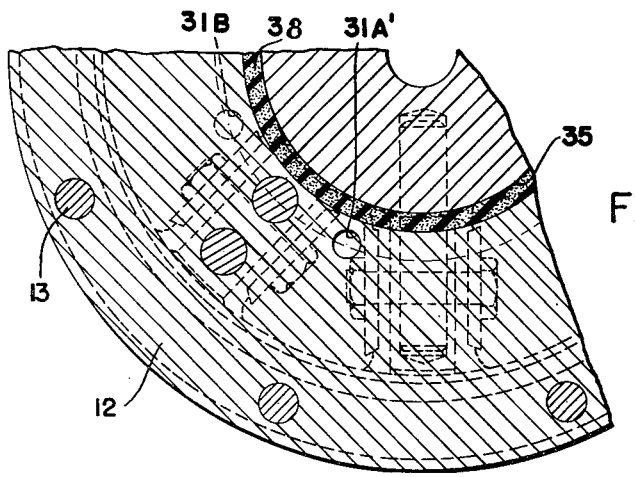
Fig. 4 is a fragmentary sectional view on line 4—4, Fig. 3.

The rotary vane motor preferably includes a cylindrical casing 10 having an integral end wall 11, closing one end of the casing, and a heavy plate 12 forming the opposite end wall and attached to the cylindrical casing by a circumferential series of screw studs 13. The joint between plate 12 and cylinder wall 10 is preferably sealed by an O-ring 12' seated in a groove in the plate 12 and held in sealing abutment with the end of the casing by means of the screws 13.

The rotor comprises a shaft 14 having its ends journaled in the end walls 11 and 12 and having a constant or unchanging diameter at least in the zones where the rotor shaft passes from the end walls into the chamber. Around the outer end portions of the journals of the rotor, the end walls are each provided with pairs of suitable annular grooves containing O-rings 15, providing a double O-ring seal for preventing fluid in the motor from working out along the shaft, and for preventing dust and dirt from working in from the outside. A third and substantially deeper annular groove 16 is provided in each end wall, spaced inwardly of the O-ring grooves, for a purpose to be described.

The rotor shaft 14 preferably has an axial duct 17 extending therethrough, through which lubricant may be supplied to a valve stem to which the rotor is connected. At one end the rotor shaft may have an enlarged bore or socket 18 for seating around a valve stem or the like, and the bore 18 may be provided with one or more keyways 19 for securing the stem non-rotatively to the rotor.

As shown in the drawings, the rotor vanes are preferably separate rectangular metal blocks 20 similar in construction to the rotor vanes shown in my copending application Serial No. 478,381. The blocks 20 may be detachably secured to the rotor shaft at diametrically opposite locations by dowel pins 21 each having one end slidably extending a substantial distance into the rotor shaft, and the other end extending slidably into aligned holes 21' in the vanes. A plurality of the dowel pins is provided spaced axially of the rotor shaft, three being shown in the drawings, and the pins preferably have a diameter which is only slightly less than the thickness of the blocks.

A pair of diametrically opposite shoes or abutments is provided in the housing between the vanes 20 to limit the rotation of the rotor in each direction. The shoes preferably comprise metal rectangular blocks 22 similar to the vanes 20, but the shoes are detachably connected to the housing. Preferably, the shoes are secured to the end walls 11 and 12 by dowel pins 23 extending axially through holes in the ends of the shoes and into aligned holes in the end walls. As shown, there may be two pins 23 at each end of each shoe, and they are preferably substantially the same diameter as the dowel pins 21 connecting the vanes to the rotor.

Both the vanes 20 and shoes 22 may be slightly undersize with respect to the axial and radial dimensions of the annular motor chamber formed between the rotor shaft and the housing, thus providing a clearance of .001″ to .002″ around all edges of the vanes and shoes. The vanes and shoes are each provided on opposite sides with novel sealing plates 24 of elastomeric material such as "neoprene," and the edge portions of the plates are flared outwardly to form outwardly extending lips 24′ which engage the walls of the casing and rotor to form a tight seal.

The outer surface of each rectangular sealing plate 24 has a rectangular recess 25 into which a rectangular clamping plate 26 is forced by clamping bolts 27 which may extend through the vanes and shoes for drawing the opposite clamping plates 26 toward each other. The plates 26 preferably have tapered edges so that they exert a wedging action to squeeze and compress the lips 24′ outwardly in all directions against the adjacent surfaces of the rotor shaft and the housing walls. As shown, there are preferably two bolts 27 extending through each vane and shoe, and the nuts 27′ on each pair of bolts may be locked against unscrewing by means of a wire 28 which is bent into S-shape and has its ends anchored in the nuts.

The construction of the separate vanes and shoes, together with the sealing plates and the clamping means therefor is described in detail in my copending application Serial No. 478,381 and, per se, forms no part of the present invention.

The annular chamber defined by the rotor shaft 14 and the walls 10, 11 and 12 of the motor is divided into two halves by the stationary shoes 22, and each of those halves is divided by the vanes 20 into two chambers which vary in volume as the vanes rotate. The chambers of one half are indicated at A and B, and the chambers of the other half are indicated at A′ and B′. Fluid conduits 30A and 30B connect through the wall 10 with a chamber on each side of one of the shoes, in this case chambers A′ and B. The chambers A and A′ are interconnected, as are the chambers B and B′, so that fluid need be supplied to or exhausted from only one chamber of each pair.

Figure 2:
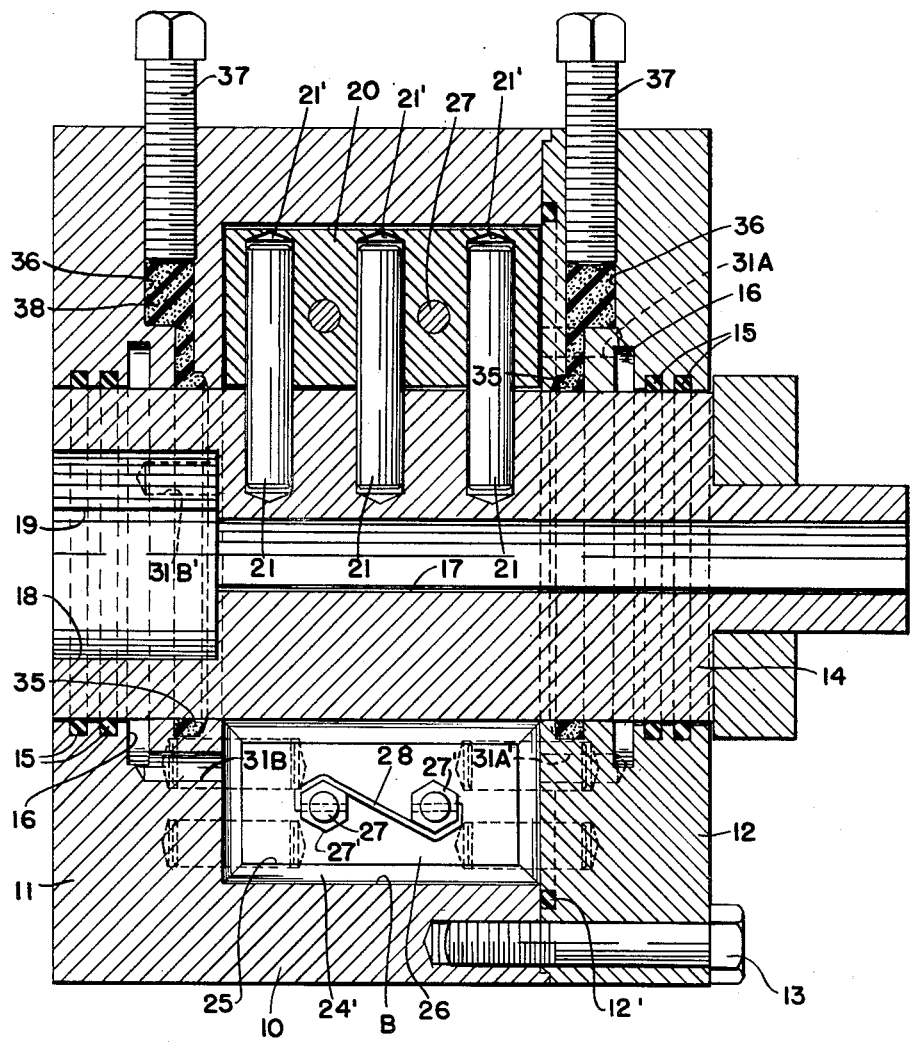
Fig. 2 is a sectional view on line 2—2, Fig. 1.
Figure 3:
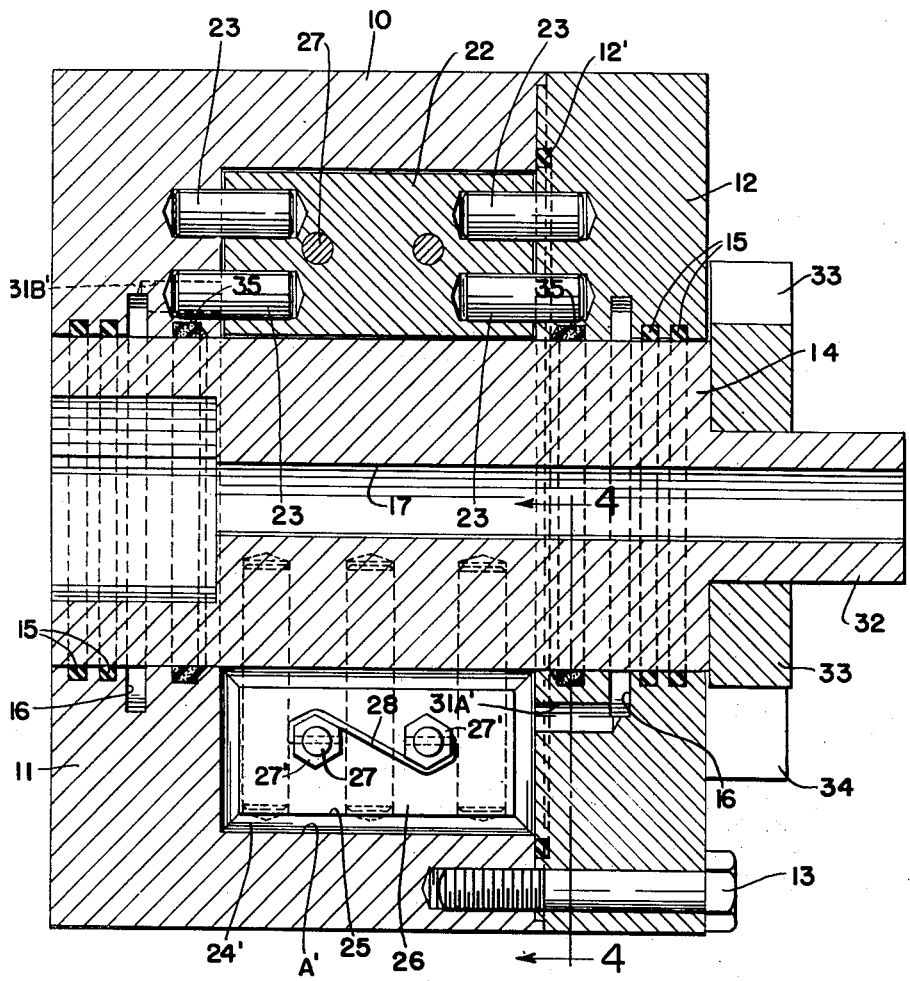
Fig. 3 is a sectional view on line 3—3, Fig. 1.

As shown in Figs. 1 and 2, the passages interconnecting chambers B and B′ preferably include ducts 31B and 31B′ extending from the chambers in a direction parallel with the rotor shaft to intersect with the inner annular groove 16 extending around the rotor shaft in end wall 11. Similarly, ducts 31A and 31A′ extend from the chambers A and A′ into end wall 12 to intersect with the annular groove 16 in end wall 12. Thus, pressure fluid introduced through conduit 30A enters chambers A′ and A and rotates the rotor counterclockwise by applying equal pressure to the diametrically opposite vanes 20, while exhausting fluids from both the chambers B and B′ through the conduit 30B. To rotate the rotor clockwise, flow through the conduits 30A and 30B is reversed.

The rotor 14 preferably has an extension 32 on the end opposite to the socket 18 and a stop collar 33 is secured thereon having extensions 33′ to cooperate with arcuate lugs 34 on the end plate 12 for limiting the rotation of the rotor in opposite directions.

In the operation of the motor, assuming fluid under pressure is being introduced through conduit 30A and exhausted through conduit 30B, as the rotor rotates counterclockwise the pressure of the fluid in chambers A and A′ aids the compressive action of the clamping plates 26 on the lips 24′ on the trailing sides of the vanes 20, and on the adjacent sides of the shoes 22, forcing the lips 24′ of the sealing plates against the rotor and the chamber walls. This action results in causing the lips to form liquid-tight seals with the abutting surfaces of the chambers, and the higher the pressure within the chambers, the tighter are the seals. On the opposite sides of the vanes 20 within the chambers B and B′, the sealing plates 24 on the leading sides of the vanes act as wipers to prevent grit and foreign matter from getting between the vanes and the surfaces of the rotor and housing and scoring said surfaces.

As previously stated, the end portions of the rotor shaft 14 are journaled in the end walls 11 and 12 and the O-rings 15 prevent the escape of fluid from the motor chambers outwardly along the shaft. Between the rings 15 and the motor chamber there is a working tolerance into which the fluid under high pressure can flow, and consequently, regardless of how close the inner O-rings are placed to the motor chamber, there is always an annular clearance space between the rotor and the surface of the end wall in which it is journaled. Obviously, this clearance space bridges over the shoes and vanes, so that fluid under high pressure which is forced into the clearance space from one chamber can follow around the annular space and leak into another chamber.

I have found that this condition can be substantially eliminated by providing an annular groove 35 in each end wall around the rotor adjacent to the motor chamber and keeping these grooves filled with a valve sealing compound by means of radial supply ducts 36 extending out through the end walls. Screws 37 are provided in the supply ducts 36 for exerting pressure on the sealing compound 38 to insure that the annular reservoir grooves 35 are kept filled with compound under pressure. The sealing compound can be any of a number of well-known valve sealing compounds including a heavy grease and other sealing compounds of high viscosity having a plastic or silicone base.

As the rotor operates, the sealing compound will be forced from the grooves 35 along the rotor in both directions and act as a bearing lubricant therefor, while completely filling the annular clearance space adjacent to the motor chamber and thus preventing fluid from entering said space and bridging over the shoes and vanes. Excess sealing compound entering the motor chamber will act as a lubricant for the seals around the shoes and vanes, thereby prolonging their life. If desired, ball check valves may be provided in the supply ducts 36 between the ends of screws 37 and the grooves 35, to insure that excessive pressures within the motor do not cause backing up of the sealing compound in the ducts 36.

While I have shown a preferred embodiment of the invention comprising the novel rotor bearing seal in a fluid motor having detachable vanes and flat sealing plates on opposite sides of the vanes and shoes, it is to be understood that the invention may be applied to a fluid motor having O-ring seals around the vanes and shoes, and having a rotor shaft with or without annular thrust shoulders within the motor chamber.

What is claimed is:

1. In a rotary fluid motor construction including a housing having side and end walls defining a fluid pressure chamber, a rotor shaft journaled in said end walls and having diametrically opposite radial vanes rotatable in said chamber, and compressible sealing means extending around the edges of the vanes to seal off fluid under high pressures on opposite sides of the vanes; the improvement comprising annular reservoir grooves in the end walls adapted to surround the rotor shaft adjacent to said chamber for containing sealing compound, viscous lubricant sealing compound filling said grooves, supply ducts extending through said end walls and communicating with said grooves, and screws threaded into said ducts for forcing said sealing compound under pressure into said grooves and cause it to flow around and seal off the adjacent journal portions of the rotor shaft.

2. In a rotary fluid motor construction including a housing having side and end walls defining a fluid pressure chamber, a rotor shaft journaled in said end walls and having diametrically opposite radial vanes rotatable in said chamber, and compressible sealing means extending around the edges of the vanes to seal off fluid under high pressures on opposite sides of the vanes; the improvement comprising annular reservoir grooves in the end walls adapted to surround the rotor shaft adjacent to said chamber for containing sealing compound, viscous lubricant sealing compound filling said grooves, and means for supplying said sealing compound under pressure to said grooves to cause it to flow around and seal off the adjacent journal portions of the rotor shaft.

References Cited in the file of this patent

UNITED STATES PATENTS

| | | |
|---|---|---|
| 860,461 | Germiner | July 16, 1907 |
| 1,799,294 | Gough | Apr. 7, 1931 |
| 2,164,876 | Horlacher | July 4, 1939 |
| 2,324,225 | Mueller | July 13, 1943 |
| 2,540,903 | Moushey et al. | Feb. 6, 1951 |
| 2,633,105 | Lasater | Mar. 31 1953 |